United States Patent [19]

Wu

[11] Patent Number: 5,504,170
[45] Date of Patent: Apr. 2, 1996

[54] AQUEOUS MICROEMULSION POLYMERIZATION OF TETRAFLUOROETHYLENE

[75] Inventor: Huey S. Wu, Newark, Del.

[73] Assignee: W. L. Gore & Associates, Inc., Newark, Del.

[21] Appl. No.: 374,008

[22] Filed: Jan. 18, 1995

Related U.S. Application Data

[63] Continuation-in-part of Ser. No. 245,326, May 18, 1994, Pat. No. 5,399,640, which is a continuation-in-part of Ser. No. 113,532, Aug. 27, 1993, abandoned.

[51] Int. Cl.[6] ....................................................... C08F 2/24
[52] U.S. Cl. ........................................... 526/214; 526/255
[58] Field of Search ................................... 526/214, 255

[56] References Cited

U.S. PATENT DOCUMENTS

| | | | |
|---|---|---|---|
| 3,391,099 | 7/1968 | Punderson | 526/214 |
| 3,475,396 | 10/1969 | McCain et al. | 526/214 |
| 3,607,878 | 9/1971 | Oullins et al. | 526/214 |
| 5,403,900 | 4/1995 | Wu et al. | |

FOREIGN PATENT DOCUMENTS

| | | | |
|---|---|---|---|
| 553813 | 3/1958 | Canada | 526/214 |
| 48-32578 | 10/1973 | Japan | 526/214 |
| 840735 | 7/1960 | United Kingdom | 526/214 |
| 1024351 | 3/1966 | United Kingdom | 526/214 |
| 1030567 | 5/1966 | United Kingdom | 526/214 |

OTHER PUBLICATIONS

108:187440, Giannetti et al (1988).
72:79617, 1C1 (1970).
JP06128335, Tokuyama Soda (1994).
78:84910, Bamford et al (1973).

*Primary Examiner*—Joseph L. Schofer
*Assistant Examiner*—N. Sarofim
*Attorney, Agent, or Firm*—Gary A. Samuels

[57] ABSTRACT

Polytetrafluoroethylene (PTFE) structures are described which are prepared by polymerizing liquid tetrafluoroethylene in an aqueous microemulsion region to obtain small particles of PTFE.

3 Claims, 5 Drawing Sheets

AQUEOUS MICROEMULSION POLYMERIZATION OF TETRAFLUOROETHYLENE

CROSS REFERENCE TO RELATED APPLICATION

This application is a continuation-in-part of application Ser. No. 08/245,326, filed May 18, 1994 now U.S. Pat. No. 5,399,640 which is a continuation-in-part of application Ser. No. 08/113,532, filed Aug. 27, 1993.

FIELD OF THE INVENTION

This invention relates to aqueous microemulsions of liquid tetrafluoroethylene containing systems and free radical polymerization of the microemulsions to produce submicron colloidal polymer particles.

BACKGROUND OF THE INVENTION

Microemulsions are stable, isotropic mixtures of oil, water, and surfactant which form spontaneously upon contact of the ingredients. Other components, such as salt or a co-surfactant (such as an alcohol, amine, or other amphiphilic molecule) may also be part of the microemulsion formulation. The oil and water reside in distinct domains separated by an interfacial layer rich in surfactant. Because the domains of oil or water are so small, microemulsions appear visually transparent or translucent. Unlike emulsions, microemulsions are equilibrium phases.

Microemulsions can have several microstructures, depending upon composition, and sometimes upon temperature and pressure. There are three most common structures. One is an oil-in-water microemulsion where oil is contained inside distinct domains (droplets) in a continuous water-rich domain. The second is water-in-oil microemulsion, so-called inverse microemulsions, where water is contained inside distinct domains (droplets) in a continuous oil-rich domain. The third is a bicontinuous microemulsion where there are sample-spanning intertwined paths of both oil and water, separated from each other by a surfactant-rich sponge-like structure.

Polymerization of emulsified and microemulsified unsaturated hydrocarbon monomers is known, where high reaction rates, high conversions and high molecular weights can be achieved. A microemulsion can be distinguished from a conventional emulsion by its optical clarity, low viscosity, small domain size, thermodynamic stability and spontaneous formation. Polymerization of microemulsified monomers has many advantages over traditional polymerization of emulsified monomers. Microemulsions are normally transparent to translucent so that they are particularly suitable for photochemical reactions, while emulsions are turbid and opaque. Also, the structural diversity of microemulsions (droplets and bicontinuous) is set by thermodynamics, and rapid polymerization may be able to capture some of the original structure. In addition, microemulsion polymerization enables production of stable, monodisperse microlatexes containing colloidal particles smaller than those produced from classical emulsion polymerization processes. Smaller particle size improves the ability to form coatings without microcracking. The increased surface area improves particle fusion during molding operations.

Emulsion polymerization, as opposed to microemulsion polymerization, of dissolved gaseous tetrafluoroethylene (PTFE) or its copolymers is a known process. Aqueous colloidal dispersions of PTFE or its copolymers can be prepared in a pressure reactor by placing the gaseous monomer, or a mixture of monomers in contact with an aqueous solution containing at least one emulsifier which generally is a fluorinated surfactant, possibly a buffer for keeping the medium at a given pH, and at least an initiator which is capable of forming free radicals at the polymerization temperature. The free radical initiators can be water soluble peroxides, or alkaline or ammonium persulfates. Persulfate can be used alone if the polymerization temperature is above approximately 50° C., or in association with a reducing agent such as ferrous salt, silver nitrate, or sodium bisulfite if the polymerization temperature is approximately between 5 to 55° C., as described in the U.S. Pat. No. 4,384,092.

The gaseous monomer molecules in the foregoing process enter the aqueous liquid and react to form polymer without first forming a distinct liquid phase. Thus, the polymer particles are large particles suspended in the aqueous mixture; and the process is not a true liquid-in-liquid emulsion polymerization. The process is sometimes referred to as dispersion polymerization.

Microemulsion polymerization operates by a different mechanism than emulsion polymerization. It involves polymerization of liquid monomer rather than gaseous monomers. Because the polymerization involves polymerization of unusually small cells of liquid monomer, the resulting polymer particles are unusually small. However, polymerization of liquid TFE is not usually practiced because of the well known potential hazards of handling.

SUMMARY OF THE INVENTION

In this invention an aqueous microemulsion of liquid tetrafluoroethylene monomer particles, and other fluorinated monomers if desired is prepared in which very small cells of monomer molecules are dispersed throughout an aqueous medium. The small cells each act as a polymerization site to form very small particles of polymers. The microemulsion is polymerized to produce a colloidal polymerization system containing polytetrafluoroethylene or its copolymers and in which the particles have an average diameter between 0.01 and 0.08 micrometer, preferably 0.01 to 0.06 micrometer. In the microemulsion, the ratio of surfactant to TFE monomer necessary to reduce the small particles has been found to be 1.17 or more. The colloidal polymer particles contain 20 to 100% by weight of polymerized tetrafluoroethylene and 0 to 80% by weight of units of at least one monomer copolymerizable with tetrafluoroethylene. The comonomers include fluorine-containing olefins of 2–18 carbons, chlorine-containing olefins of 2–18 carbons, or fully hydrogenated olefins of 2–18 carbons for example ethylene or propylene. Crosslinking agents may be present, for example, glycidylvinyl ether, chloroalkyl vinyl ether, and the like.

It has been found that different forms of polytetrafluoroethylene (PTFE) can be obtained depending on the ratio of components in the microemulsion. A phase diagram of the types of products obtained depending on the weight ratio of components is set forth in the diagram of FIG. 1. As seen, microemulsions form in the area within the dotted lines. In that area, it is seen that the shaded area denotes the area in which particles of PTFE homopolymer is obtained. Below the dotted line a spongy mass of fibril-like material is obtained.

When the ratio of surfactant to liquid TFE monomer is about 1:1, the PTFE material found is platelet-like.

When the ratio of surfactant to liquid TFE monomer is greater than 1.17, small particles of PTFE are formed. Thus, ratios of surfactant to TFE monomer, by weight, of over 1.17 are beneficial in producing small, round particles of PTFE of very high molecular weight.

The, resulting colloidal particles can be coagulated to produce ultra fine powders. They can be used for surface coatings on a variety of substrates. The substrates include organic or inorganic polymeric surfaces, metal or ceramic surfaces, etc. The colloidal particles can be mixed with other materials such as chemicals, polymers, pigments, metals, inorganics such as silicates, etc. to form polymer alloys, stain resistant articles, electronic conduction materials, etc.

DETAILED DESCRIPTION OF THE INVENTION

Figure 1:
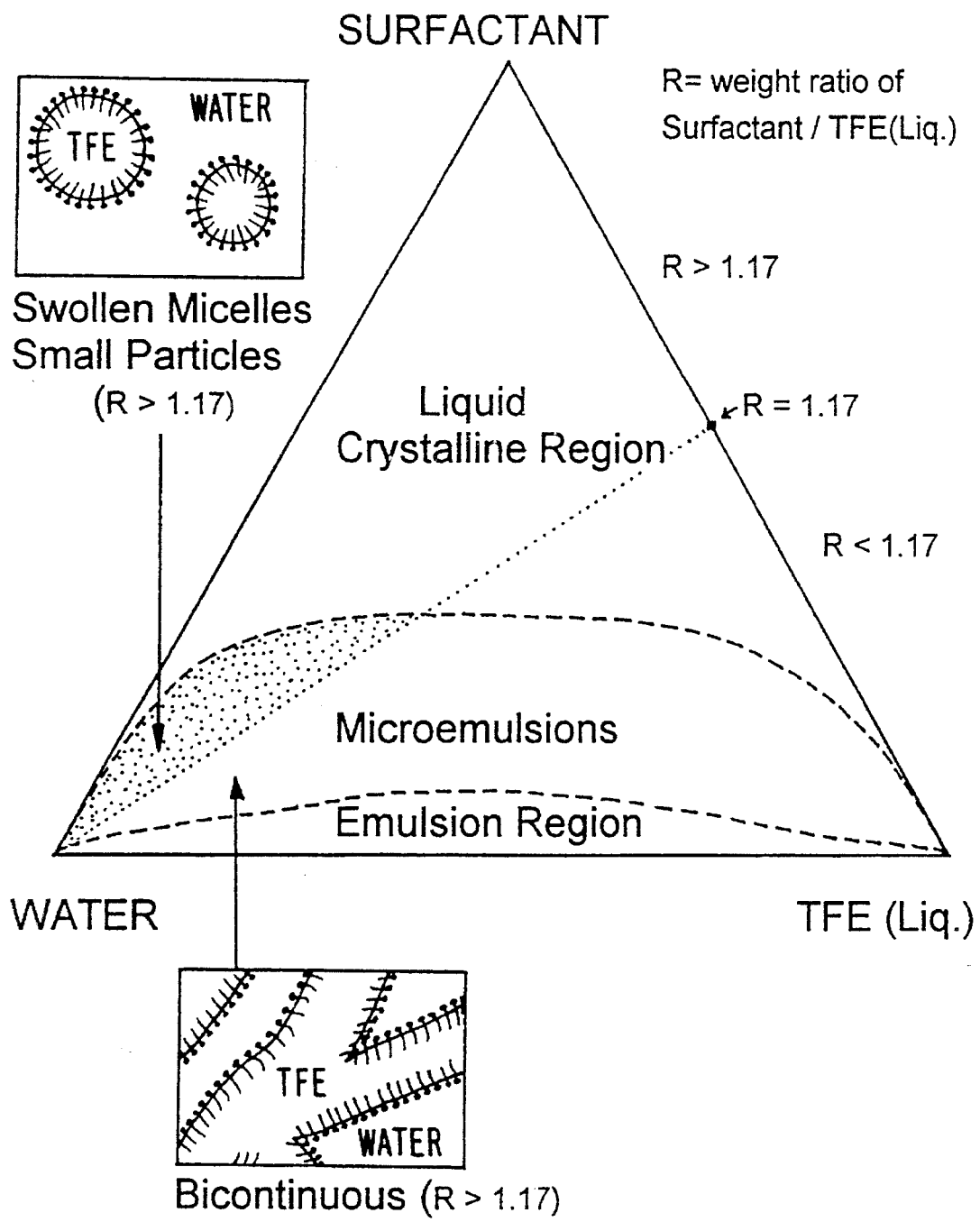
FIG. 1 is a phase diagram of a mixture of water, fluorinated surfactant and liquid TFE.

The ingredients, ratios and conditions of the microemulsion are selected to result in polymerization of liquid tetrafluoroethylene (TFE). In one aspect, the resulting polymers have a three-dimensional continuous micro-network of fibrils and bundles of fibrils and randomly dispersed platelets of TFE polymers.

In another aspect, the resulting polymer produced is a gel characterized as a spongy mass comprised visually of layers of sheet-like configurations, and which has a microstructure of a three-dimensional continuous network of convoluted randomly disposed fibrils and bundles of fibrils of TFE polymers.

In another aspect, the polymer produced is characterized as a spongy mass having a microstructure of predominantly randomly disposed platelets interconnecting or interpenetrating one another and also being randomly connected by randomly disposed fibrils, to form a three-dimensional continuous network of TFE polymer.

In still another aspect, very small particles of TFE polymer are produced.

Which form of polymer is produced depends on the ratio of surfactant to liquid TFE, as described above.

By microstructure, and the like, is meant that the structure is not visible to the naked eye.

To form the polymers, a mixture of liquid tetrafluoroethylene (TFE) and at least one fluorinated surfactant in water is employed. In this invention the TFE is introduced to the reaction vessel in liquid form or in gaseous form and subsequently liquified. The amount of surfactant used in the reaction is adjusted to maximize the formation of the type of particle desired as described above. A suitable fluorinated surfactant or a mixture of fluorinated surfactants are needed with the weight ratio of the surfactants to monomers in the liquid phase of being adjusted according to the product desired. There is no criticality in an upper limit, but generally one usually does not go higher than 5:1. Suitable fluorinated surfactants include a fluorinated anionic surfactant, for example a salt of a fluorinated carboxylic acid or a sulfonic acid, a sulfate, a cationic surfactant for example a fluorinated quaternary ammonium salt; or a fluorinated nonionic surfactant. The mixture can be formed preferably at a temperature below the critical temperature (Tc) of TFE, approximately 33.3° C. for TFE, and above the freezing temperature of the surfactant containing aqueous solution. Mechanical stirring can be provided. Free radical polymerization can be initiated by adding water-soluble free radical initiators, for example, a peroxide, an alkaline or ammonium persulfate, or some water soluble azo compounds or a salt of permanganate. The free radical initiators can also be used in association with a reducing agent such as ferrous salt, silver nitrate, sodium bisulfite, and the like. It is also possible to initiate the polymerization by photochemical reactions. The possible photoradiation source include ultraviolet (UV)light, electron beam, or gamma radiation. The polymerization temperature can be between 5 to 100° C., and preferably between 5 to 33.3° C. for polytetrafluoroethylene.

Comonomers that may be present in the mixture include halogenated (chlorine or fluorine) olefins of 2–18 carbon atoms, for example vinyl chloride, vinylidene chloride, chlorotrifluoroethylene, hexafluoropropylene, perfluoroalkyl vinyl ether, or the like; hydrogenated unsaturated monomers, such as ethylene, propylene, isobutylene, vinyl acetate, acrylates, or the like; crosslinking agents, such as glycidylvinylether, chloroalkyl vinyl ether, allylglycidylether, acrylates, methacrylates, or the like. The amount of comonomer that can be present should not be so great as to change the nature of the product that would be obtained if PTFE had been the product.

PTFE produced from microemulsion polymerization when the surfactant/monomer ratio is at least 1.17 comprises ultra fine colloidal particles having an average diameter from 0.01 to 0.08 micrometer, preferably 0.01 to 0.06 micrometer, most preferably 0.0 to 0.04, and a polymer average molecular weight of over 100,000, preferably over 500,000 and most preferably over 1,000,000.

The resulting ultra fine colloidal particles can be mixed with other chemicals, polymers, pigments, carbons, or metals to form a composite material such as a polymer alloy, a strain resistant, mold release coating on articles, or electronic conductors or shieldings, etc. They can be prepared in the form of organosols to impart ultrafine surface coating on substrates, such as fabrics, metals, ceramics, etc. The ultrafine powder of PTFE can also be used to prepare microporous expanded PTFE article with ultra small pore size. In addition, the PTFE containing colloidal particles can be used as a white pigment or a modifier which improves flame resistance, non-tackiness, water repellency, soil resistance, corrosion resistance, and weather resistance properties on various substrates, porous or nonporous. The polymers can be also used to form a membrane for filtration, microfiltration or ultrafiltration applications.

REFERENCE EXAMPLE 1

In this example, the weight ratio of surfactant to TFE monomer was 140/230; i.e., less than 1.17. The polymerized product was a sponge-like gel of fibril nature.

In a 2-liter pressure vessel, 900 gram distilled water, 140 grams ammonium perfluoroctanoate (APFO) and 0.2 gram of ammonium persulfate were charged and the vessel was kept at 22° C. The vessel was purged with nitrogen, followed by pulling a vacuum. The vessel was then purged with tetrafluoroethylene gas, followed by pulling another vacuum. Purging the vessel with tetrafluoroethylene gas followed by vacuum was repeated three times. The oxygen content of the aqueous phase was about 28 ppm. Then, liquid tetrafluoroethylene monomer was charged to the vessel. Approximately 230 grams of tetrafluoroethylene liquid was introduced into the aqueous mixture. The vapor phase over the vessel contents filled spontaneously with tetrafluoroethylene gas to a pressure of about 30 Kg/cm$^2$. The liquid phase was stirred with a constant speed of about 400 rpm.

0.1 gram of sodium sulfite and 0.1 gram of ferrous sulfate in 100 grams of distilled water was charged to the vessel. Polymerization started instantaneously. The vessel was kept at a temperature between 25° to 30° C. by cooling the vessel with cold brine, and the pressure was between 34 to 40 K/cm$^2$. Reaction proceeded for about 95 minutes and stopped. When the pressure inside the vessel was released, a lot of foam came out. The pressure vessel was found to be filled with sponge-like white gel material. The gel was taken out by a spoon. When the gel was placed in boiling water for about 10 minutes it did not melt, nor was the shape deformed. Visually, the white material has a spongy layered structure. The gel material was washed several times with distilled water and dried in an oven at a temperature of about 140° C. for 24 hours. The dried material still looked white and felt like a sponge. The total weight of polymer solids was about 230 grams.

Figure 2:
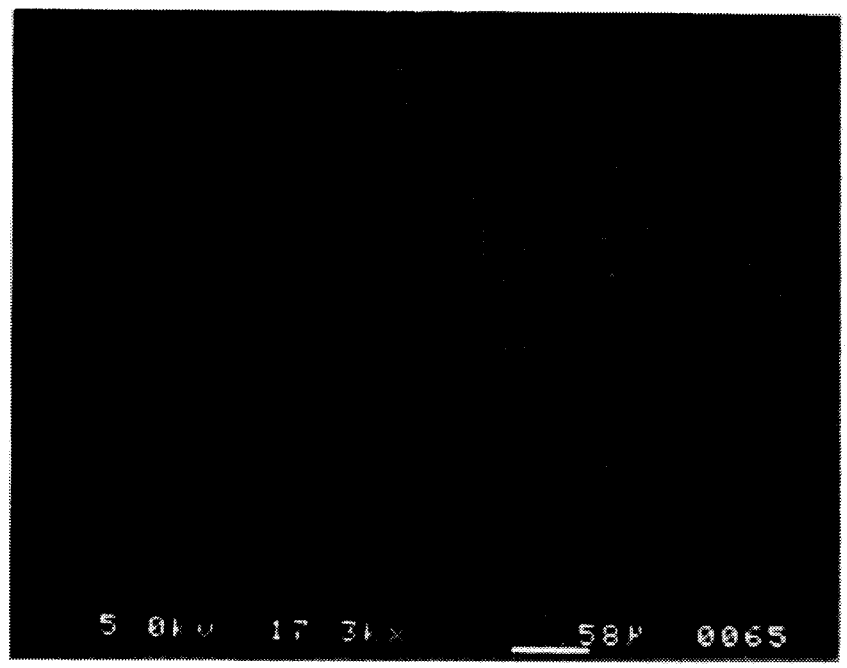
FIGS. 2 and 3 are SEMs of The polymer produced in Example 1.
Figure 3:
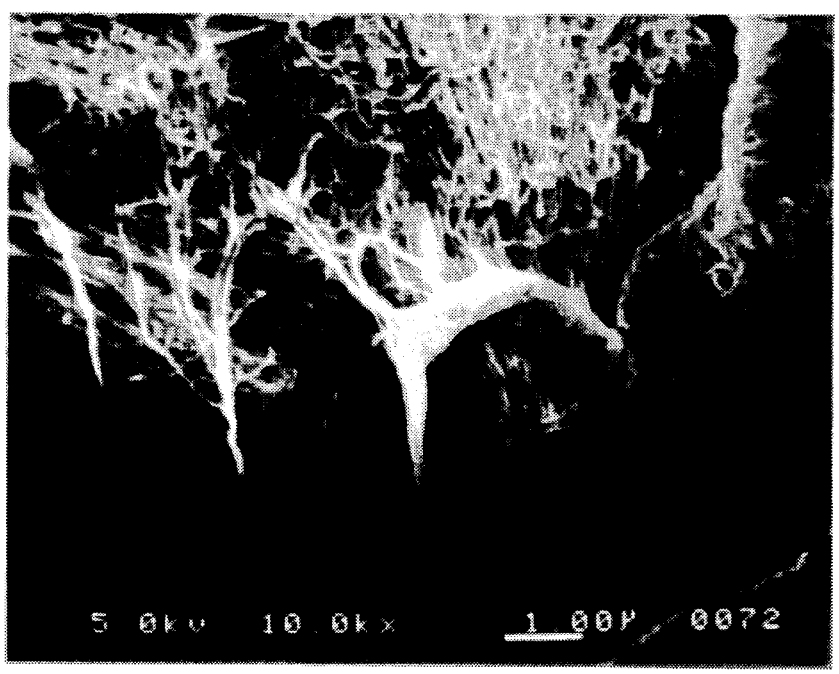

The material was subjected to tests for characterization. Thermal analysis of the dried material confirmed the material to be polytetrafluoroethylene. Differential scanning calorimetry (DSC) analysis showed this material has a melting temperature at about 339° C. DSC was run at a heating rate of 10° C./min. Scanning electron microspy (SEM) showed that the material has not only layers of sheet like microstructure but also 3dimensional continuous network structure of fibrils and fibril bundles (as seen in FIGS. 2 and 3) sometimes platelets interpenetrating or interconnecting each other are observed. The fibril structure looks like tree roots entangled with each other.

Surface analysis on the sponge-like material taken from the center of the reactor vessel shows its surface area to be about 19.5 m$^2$/gram and its average pore diameter to be about 20 Angstroms. These measurements were made by Porous Materials, Inc., Analytical Services Division at Cornell Industrial, Research Park, Ithica, N.Y. using an auto adsorption system with nitrogen as adsorbate. The instrument temperature was 303.36 K. and room temperature was 298.56 K. Sample weight is 1.11 gram and was outgassed to 2×10$^{-5}$ atmosphere vacuum at about 24° C. Surface area was calculated by volumetric multipoint BET method and the average pore diameter is calculated by the Pierce method.

REFERENCE EXAMPLE 2

In this Example, the weight ratio of surfactant to TFE monomer was 70/120 i.e., less than 1.17. A sponge-like fibrous material was obtained.

In a 2-liter pressure vessel, 1000 grams distilled water, 70 grams ammonium perfluorooctanoate and 0.2 gram of ammonium persulfate were charged and the vessel kept at 15° C. The vessel was purged with nitrogen followed by a vacuum. The vessel was then purged with tetrafluoroethylene gas followed by a vacuum. Purging the vessel with tetrafluoroethylene gas followed by a vacuum was repeated three times. The oxygen content of the aqueous phase was about 21 ppm. Then, liquid tetrafluoroethylene monomer was charged to the vessel. Approximately 120 grams of tetrafluoroethylene liquid was charged to the aqueous mixture. The vapor phase above the liquid filled with tetrafluoroethylene gas with a pressure about 27.5 Kg/cm$^2$. The liquid phase was stirred at a constant speed of about 400 rpm.

0.2 gram of sodium sulfite and 0.1 gram of ferrous sulfate in 100 grams of distilled water was charged to the vessel, and polymerization started instantaneously. The vessel was kept at a temperature between 15° to 25° C. and the pressure was between 28 to 31 Kg/cm$^2$. The reaction proceeded for about 106 minutes and stopped. A transparent to translucent aqueous dispersion, slightly viscous, was obtained. The aqueous dispersion was subjected to a centrifuge at a rotation speed about 1000 rpm for about 10 minutes. The aqueous dispersion remained stable, with no coagulation. The aqueous dispersion was coagulated with acetone and yielded a sponge-like white material. The sponge-like material was washed several times by acetone arid dried in an oven at a temperature of about 140° C. for 24 hours. The dried material was still white.

The material was subjected to tests for characterization.

Figure 4:
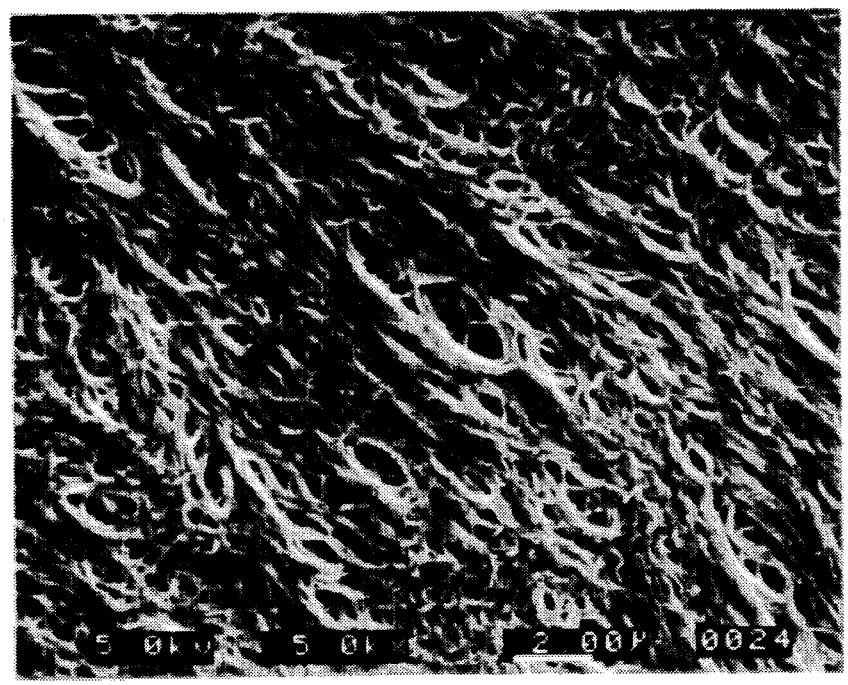
FIGS. 4 and 5 are SEMs of polymer produced in Example 2.
Figure 5:
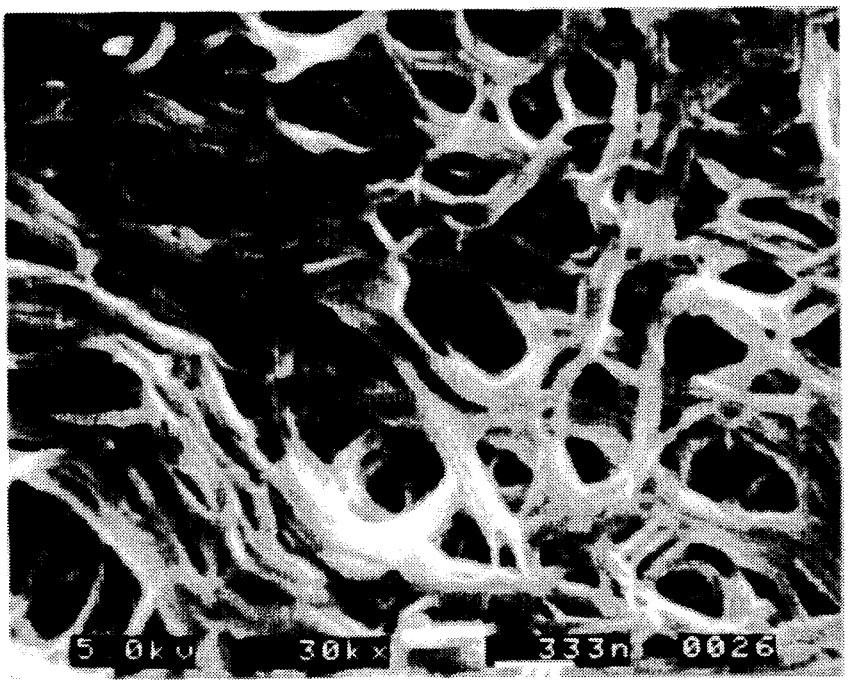

DSC results on the air dried material indicated that it has melting characteristics of polytetrafluoroethylene. SEM results on the air dried colloidal material showed remarkably randomly disposed microfibrils and microfibril bundles interconnecting and interpenetrating each other forming a three-dimensional continuous network structure of a convoluted, non-aligned nature, as shown in FIGS. 4 and 5.

REFERENCE EXAMPLE 3

In this example, the weight ratio of surfactant to TFE liquid monomer was 35/30, i.e.,1.166. The product was a mixture of a sponge-like polymer and platelets.

In a 2liter pressure vessel, 1000 grams distilled water, 35 grams ammonium perfluorooctanoate, and 0.2 gram of ammonium persulfate were charged and the vessel kept at 15° C. The vessel was purged with nitrogen followed by a vacuum. The vessel was then purged with tetrafluoroethylene gas followed by a vacuum. Purging the vessel with tetrafluoroethylene gas followed by a vacuum was repeated three times. The oxygen content of the aqueous phase was about 14 ppm. Then, tetrafluoroethylene liquid monomer was charged to the vessel. Approximately 30 grams of tetrafluoroethylene liquid was charged to the aqueous mixture. The vapor phase filled with tetrafluoroethylene gas with pressure about 26 Kg/cm$^2$. The liquid phase was stirred with a constant speed of about 400 rpm.

0.2 gram of sodium sulfite and 0.1 gram of ferrous sulfate in 100 grams of distilled water was charged to the vessel. Polymerization started instantaneously. The vessel was kept at a temperature between 15° to 20° C. and the pressure was between 27 to 28 Kg/cm$^2$. The reaction proceeded for about 105 minutes and stopped. A transparent aqueous dispersion was obtained. The aqueous dispersion was subjected to a centrifuge at a rotation speed about 1000 rpm for about 10 minutes. The aqueous dispersion remained stable with no coagulation. The aqueous dispersion was coagulated with acetone and the resulting product was a sponge like white material. The sponge-like material was washed several times with acetone and dried in an oven at a temperature of about 140° C. for 24 hours. The dried material was white and felt like a sponge.

The material was subjected to tests for characterization.

Figure 6:
FIGS. 6 and 7 are SEMs of polymer produced in Example 3.
Figure 7:
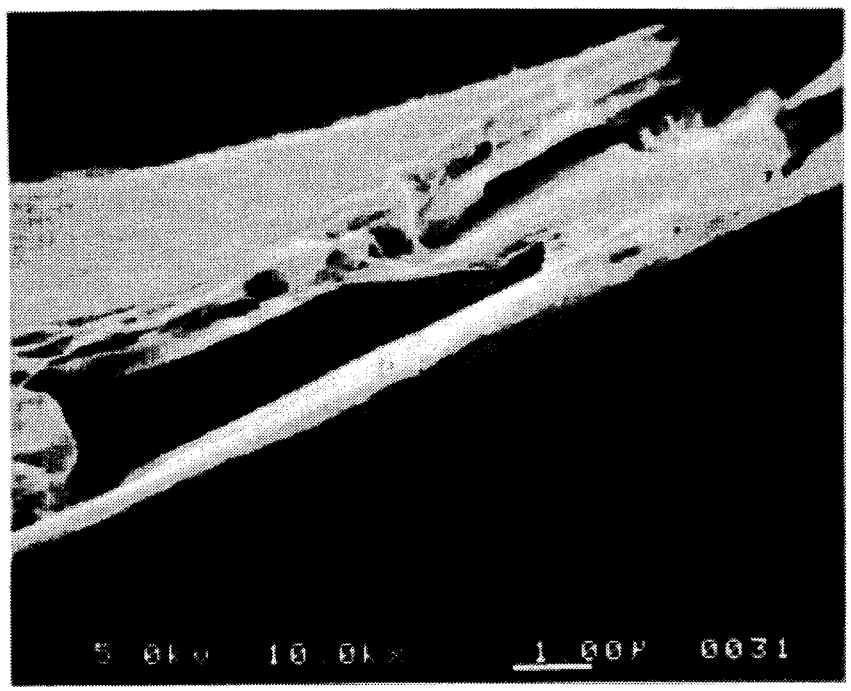

DSC results on the dried material showed melting characteristics of polytetrafluoroethylene. SEM results on the material showed remarkably randomly disposed platelets and microfibrils interconnecting or interpenetrating each other forming a three-dimensional continuous network structure, as shown in FIGS. 6 and 7.

EXAMPLE 1

In this example, the weight ratio of surfactant to TFE liquid monomer was 330/230, i.e., well over 1.17. The resulting polymer was comprised of very small particles of PTFE, on the order of 0.001–0.06 micrometer.

Into a 10 liter pressure vessel was charged 5Kg deionized $H_2O$ and 330 g ammonium perfluoroctanoate (Fluorad FC143, 3M). The pressure vessel was under vacuum and had been purged with tetrafluoroethylene gas by a vacuum repressive sequence three times. The oxygen content of the aqueous mixture was less than 20 ppm. The pressure vessel was cooled to be about 10° C. and tetrafluoroethylene gas was fed into the reactor and some tetrafluoroethylene was allowed to condense into a liquid form in aqueous phase. Total amount of liquid tetrafluoroethylene charged to the pressure vessel was about 230 g. The APFO/TFE ratio was over 1.17. It is believed that the liquid tetrafluoroethylene forms as an oil in water microemulsion in aqueous mixture. The pressure vessel was equipped with a mixer and was used to stir the aqueous mixture at a speed of about 400 rpm. 2 grams of ammonium persulfate in 100 g $H_2O$ were charged to the vessel, followed by 1 gram of ferrous sulfate ($FeSO_4$) and 2 grams of sodium sulfite ($Na_2SO_3$) in 100 g $H_2O$ to initiate polymerization. The pressure inside the vessel was about 30 $Kg/cm^2$ starting from initiation to the end of about 2 hours reaction time. There was no significant pressure change throughout the reaction, which indicated that very little tetrafluoroethylene in the vapor phase participated the reaction. The temperature of the aqueous mixture inside the vessel was maintained between 10°–12° C., employing brine water. After about 2 hours of reaction, tetrafluoroethylene gas was released from the vessel and the aqueous dispersion was discharged.

Figure 8:
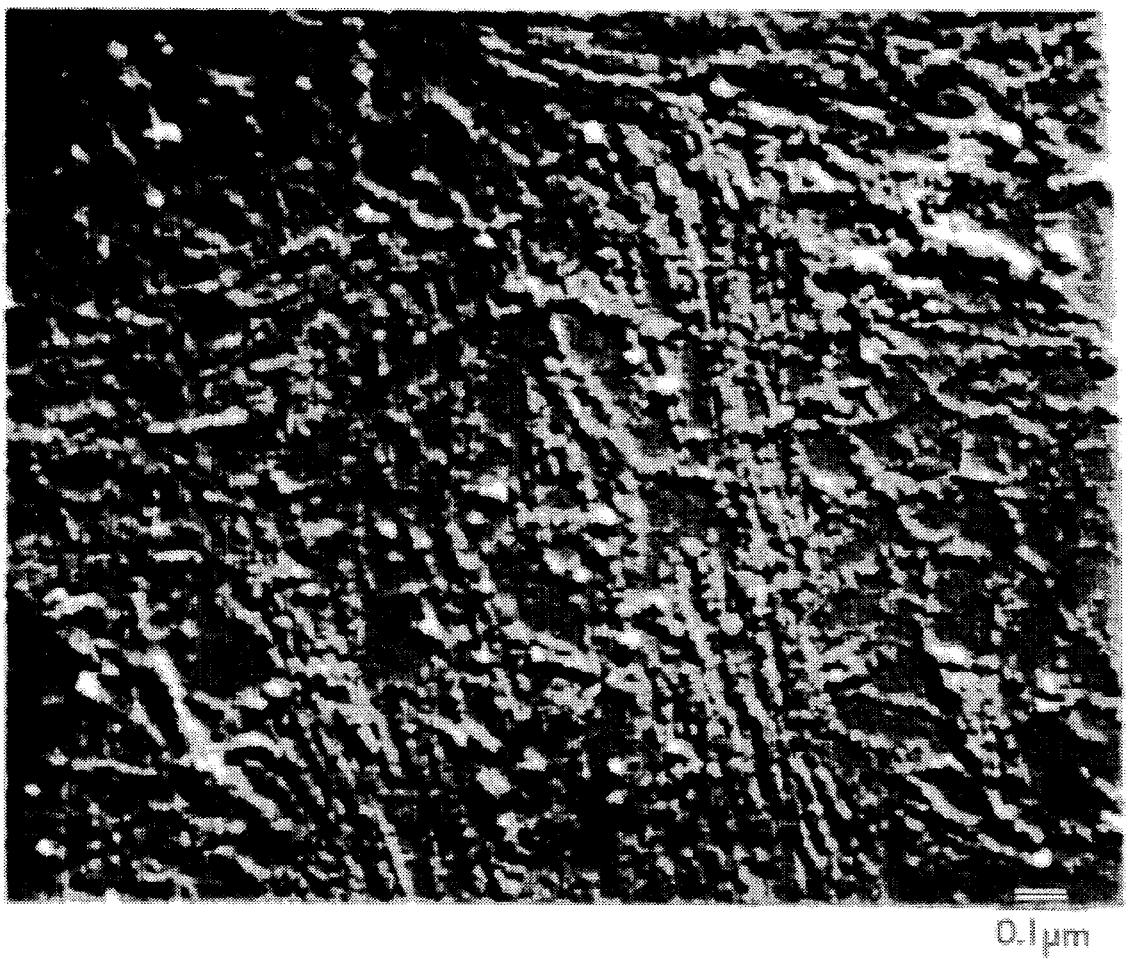
FIG. 8 is an SEM of polymer produced in Example 4.

The aqueous dispersion looked clear, and contained about 4% polymer content. The melting temperature of the polymer was determined by Differential scan Calorimetry (DSC) to be about 331° C., which is in the melting range of polytetrafluoroethylene. The PTFE polymers formed are found to be very small in size by high resolution electron microscopy as shown in FIG. 8. The clarity of the dispersion is indicative of presence of small particles on the order of 0.06 micrometer or less in size.

I claim:

1. Process for preparing tetrafluoroethylene polymers which comprises:

(a) charging at least one fluorine-containing surfactant to a pressure vessel containing water;

(b) charging liquid tetrafluoroethylene and optionally minor amounts of other fluorinated or non-fluorinated ethylinically-unsaturated monomers to the vessel;

(c) initiating free radical polymerization by adding at least one free-radical initiator; and (d) recovering the resulting polymerizate; wherein the weight ratio of fluorine-containing surfactant to all liquid tetrafluoroethylene is over 1.17.

2. The process of claim 1 wherein tetrafluoroethylene is the only monomer present.

3. The process of claim 1 or 2 wherein the weight ratio of the fluorine-containing surfactant to all monomers is at least ¼ or more.

* * * * *